(12) United States Patent
Kosaka et al.

(10) Patent No.: US 10,703,019 B2
(45) Date of Patent: Jul. 7, 2020

(54) RESIN-IMPREGNATED FIBER BUNDLE, COMPRESSION MOLDED ARTICLE, AND A METHOD FOR PRODUCING THE SAME

(71) Applicant: Daicel Polymer Ltd., Minato-ku, Tokyo (JP)

(72) Inventors: Shigeyuki Kosaka, Tokyo (JP); Satoru Shibata, Tokyo (JP)

(73) Assignee: DAICEL POLYMER LTD., Minato-ku, Tokyo (JP)

( * ) Notice: Subject to any disclaimer, the term of this patent is extended or adjusted under 35 U.S.C. 154(b) by 0 days.

(21) Appl. No.: 16/078,178

(22) PCT Filed: Mar. 9, 2017

(86) PCT No.: PCT/JP2017/009353
§ 371 (c)(1),
(2) Date: Aug. 21, 2018

(87) PCT Pub. No.: WO2017/155009
PCT Pub. Date: Sep. 14, 2017

(65) Prior Publication Data
US 2019/0061201 A1 Feb. 28, 2019

(30) Foreign Application Priority Data

Mar. 11, 2016 (JP) .................... 2016-048232
Apr. 1, 2016 (JP) .................... 2016-074008

(51) Int. Cl.
| | | |
|---|---|---|
| *B29B 9/14* | (2006.01) | |
| *B29B 9/06* | (2006.01) | |
| *B29C 43/00* | (2006.01) | |
| *B29B 7/90* | (2006.01) | |
| *C08L 101/00* | (2006.01) | |
| *C08J 5/04* | (2006.01) | |
| *B29C 43/34* | (2006.01) | |
| *C08J 5/24* | (2006.01) | |
| *B29K 105/06* | (2006.01) | |
| *B29C 43/02* | (2006.01) | |
| *B29K 307/04* | (2006.01) | |
| *B29C 43/52* | (2006.01) | |
| *B29K 23/00* | (2006.01) | |
| *B29K 309/08* | (2006.01) | |

(52) U.S. Cl.
CPC .............. *B29B 9/14* (2013.01); *B29B 7/90* (2013.01); *B29B 9/06* (2013.01); *B29C 43/003* (2013.01); *B29C 43/006* (2013.01); *B29C 43/34* (2013.01); *C08J 5/04* (2013.01); *C08J 5/24* (2013.01); *C08L 101/00* (2013.01); *B29C 43/02* (2013.01); *B29C 43/52* (2013.01); *B29K 2023/12* (2013.01); *B29K 2105/06* (2013.01); *B29K 2307/04* (2013.01); *B29K 2309/08* (2013.01); *C08J 2323/12* (2013.01)

(58) Field of Classification Search
CPC ........................................................ B29B 9/14
USPC ........................................................ 428/220
See application file for complete search history.

(56) References Cited

U.S. PATENT DOCUMENTS

| | | | | |
|---|---|---|---|---|
| 2004/0170554 A1* | 9/2004 | Wadahara | ............... | B29B 11/16 423/447.2 |
| 2010/0075144 A1* | 3/2010 | Davies | ....................... | C08J 5/04 428/375 |

FOREIGN PATENT DOCUMENTS

| | | |
|---|---|---|
| JP | 2000-210933 A | 8/2000 |
| JP | 2004-014990 A | 1/2004 |
| JP | 2011-162905 A | 8/2011 |
| JP | 2012-052093 A | 3/2012 |
| JP | 2012-131104 A | 7/2012 |
| JP | 2012-131918 A | 7/2012 |
| JP | 2012-153109 A | 8/2012 |
| JP | 2013-107979 A | 6/2013 |
| JP | 2013-121988 A | 6/2013 |
| JP | 2015-147428 A | 8/2015 |
| JP | 2016-020465 A | 2/2016 |
| WO | WO 2014/030633 A1 | 2/2014 |

OTHER PUBLICATIONS

Extended European Search Report for corresponding application No. 17763349, dated Oct. 8, 2019, (5 pages).
International Search Report for PCT/JP2017/009353 (2 pgs).
International Preliminary Report on Patentability for PCT/JP2017/009353, dated Sep. 11, 2018 (1 pg.).
English translation of Written Opinion of the International Searching Authority for PCT/JP2017/009353, dated May 9, 2017 (4 pgs.).

* cited by examiner

*Primary Examiner* — Brent T O'Hern
(74) *Attorney, Agent, or Firm* — Flynn Thiel, P.C.

(57) ABSTRACT

A resin-impregnated fiber bundle that can provide a molded article with a high surface impact strength is prepared by impregnating and integrating 100 parts by mass of a bundle of a fiber material (A) with 25 to 300 parts by mass of a thermoplastic resin (B). The fiber bundle has a flattened shape with a lateral cross-sectional shape having a major axis and a minor axis (length of the major axis>length of the minor axis). An average length (D1) of the major axis is 0.5 to 2.0 mm. An average flatness ratio (D1/D2), determined from the average length (D1) of the major axis and an average length (D2) of the minor axis, is 1.2 to 8.01. The fiber bundle has a length (L) of 11 to 50 mm, a ratio (L/D1) between L and D1 is 10 to 50, and a bulk density is 0.1 to 0.4 g/cm$^3$.

3 Claims, No Drawings

RESIN-IMPREGNATED FIBER BUNDLE, COMPRESSION MOLDED ARTICLE, AND A METHOD FOR PRODUCING THE SAME

TECHNICAL FIELD

The present invention relates to a resin-impregnated fiber bundle containing a thermoplastic resin and a reinforcing fiber, a compression molded article, and a method for producing the same.

BACKGROUND ART

A method for obtaining a molded article by molding by injection a pellet composed of a thermoplastic resin and a reinforcing fiber is generally used.

However, when an injection-molding method is employed, there occurs a problem in which reinforcing fibers are broken and shortened during the process of injection molding, and thus the reinforcing effect is deteriorated.

Patent Literature 1 (JP-B 3631994) and Patent Literature 2 (JP-B 4743592) disclose an invention wherein a press molding method is employed instead of an injection molding method.

Patent Literature 1 discloses an invention of a long-fiber-reinforced thermoplastic resin (hereinafter, referred to as L-FRTP) sheet, wherein wire rods, each of which has a width of from 0.2 to 5 mm and a length of from 10 to 150 mm and is made of an unidirectionally L-FRTP, are oriented at random and fixed together at intersections thereof, and the sheet has a basis weight of 30 to 500 g/m² and a thickness of 0.1 to 1 mm and is provided with openings therein; and also an invention of a composite structure, wherein the L-FRTP sheet is arranged on at least one surface or an interior of a specific base material.

The section for Advantages of the Invention (paragraph 0051) describes that the surface rigidity of an L-FRTP sheet can be improved.

Patent Literature 1 describes that the L-FRTP has a circular or elliptical cross-sectional shape, and a long diameter/short diameter ratio of the cross-section is 3 or less (paragraph 0016). However, those used in the Example are only L-FRTP having a circular cross-sectional shape and not L-FRTP having an elliptical cross-sectional shape. This means that Patent Literature 1 discloses that those with a circular cross-section are preferred to obtain the advantages of the invention.

Patent Literature 2 discloses an invention of a long fiber reinforced thermoplastic resin linear molding material and a method for producing a long fiber reinforced thermoplastic resin molded article (Claims).

Regarding the cross-sectional shape of the long fiber reinforced thermoplastic resin linear molding material, Patent Literature 2 describes that "(a) The cross-sectional shape is close to a circle or an ellipse. This makes it easy to spray the linear molding material in a three-dimensional orientation, and press-molding of thus sprayed material can provide a sheet material or a molded article having reinforcement fibers oriented in a three-dimensional manner (paragraph 0028)." However, the Examples, Reference Examples and Comparative Examples thereof do not refer to the cross-sectional shape, so it is considered that the cross-sectional shape is circular like the invention of Patent Literature 1.

SUMMARY OF INVENTION

The present invention has an object of providing a resin-impregnated fiber bundle capable of providing a molded article with a high surface impact strength, a compression molded article obtained from the resin-impregnated fiber bundle, and a production method thereof.

The present invention provides:

a resin-impregnated fiber bundle prepared by impregnating and integrating 100 parts by mass of a bundle of a fiber material (A) with 25 to 300 parts by mass of a thermoplastic resin (B), wherein:

the resin-impregnated fiber bundle has a flattened shape with a lateral cross-sectional shape having a major axis and a minor axis (length of the major axis>length of the minor axis);

an average length (D1) of the major axis is 0.5 to 2.0 mm;

an average flatness ratio (D1/D2) determined from the average length (D1) of the major axis and an average length (D2) of the minor axis is 1.2 to 8.0;

the resin-impregnated fiber bundle has a length (L) of 11 to 50 mm and a ratio (L/D1) between L and D1 is 10 to 50; and a bulk density is 0.1 to 0.4 g/cm³;

a compression molded article obtained therefrom; and a method for producing the compression molded article.

The compression molded article obtained from the resin-impregnated fiber bundle of the present invention especially has a high surface impact strength.

Further, the method for producing a compression molded article of the present invention combines a pre-heating process utilizing a non-contact heater with a subsequent compression process, thereby making it easy to adjust the density of an obtained compression molded article.

EMBODIMENTS OF THE INVENTION

<Resin-Impregnated Fiber Bundle>

The fiber material used for a bundle of fiber material (Component A) is preferably selected from carbon fibers, glass fibers and aramid fibers, but it is not limited thereto.

The number of bundles of fiber material is adjusted by taking into consideration the outer diameter (major axis length and minor axis length) of a resin-impregnated fiber bundle.

As the thermoplastic resin (Component B), usable is one selected from polyamide resins (Polyamide 6, Polyamide 66, Polyamide 12, etc.), olefin resins (polypropylene, high-density polyethylene, acid-modified polypropylene, etc.), polyphenylene sulfide resins, polyesters (polyethylene terephthalate, polybutylene terephthalate, etc.), thermoplastic urethane resins (TPU), polyoxymethylene resins (POM), ABS resins, polycarbonate resins, an alloy of a polycarbonate resin and an ABS resin, and others.

As the thermoplastic resin (Component B), an alloy composed of two or more resins may be used; and in that case, an appropriate compatibilizing agent may be contained.

Regarding the content ratio of the bundle of fiber material (Component A) and the thermoplastic resin (Component B), 25 to 300 parts by mass, preferably 30 to 150 parts by mass, and more preferably 40 to 100 parts by mass of Component B are used relative to 100 parts by mass of Component A.

The resin-impregnated fiber bundle may contain a publicly-known additive for a resin in accordance with the use. Examples of the additive for a resin include a flame retardant, a heat stabilizer, a light stabilizer, a coloring agent, an antioxidant, an antistatic agent, a lubricant, and others.

The resin-impregnated fiber bundle has a flattened shape with a lateral cross-sectional shape having a major axis and a minor axis (length of the major axis>length of the minor axis).

The major axis of the resin-impregnated fiber bundle has an average length (D1) of 0.5 to 2.0 mm, preferably 0.5 to 1.5 mm.

The average flatness ratio (D1/D2) of the resin-impregnated fiber bundle is determined from the average length (D1) of the major axis and the average length (D2) of the minor axis, and the ratio is 1.2 to 8.0, preferably 1.5 to 5.0, and more preferably 1.5 to 3.0.

The length (L) of the resin-impregnated fiber bundle is 11 to 50 mm, and preferably 15 to 40 mm.

The ratio between L and D1 (L/D1) is 10 to 50, preferably 15 to 50, and more preferably 20 to 40.

The resin-impregnated fiber bundle has a bulk density of 0.1 to 0.4 g/cm$^3$, preferably 0.1 to 0.3 g/cm$^3$, and more preferably 0.1 to 0.2 g/cm$^3$.

The bulk density mentioned herein is a packing density (m/v$_0$), which can be calculated by gently charging a weighed resin-impregnated glass fiber bundle (mass: m) into a measuring container such as a graduated cylinder without compaction, and reading a loose bulk volume (v$_0$) in a (loosened) state without tapping.

The resin-impregnated fiber bundle includes a bundle having an elliptical lateral cross-sectional shape and a bundle having a non-elliptical lateral cross-sectional shape.

In the bundle having an elliptical lateral cross-sectional shape, all surfaces are curved. In the bundle having a non-elliptical lateral cross-sectional shape, some of surfaces are flat, and for example, all or a part of the surfaces facing the minor axis are flat.

If resin-impregnated fiber bundles have the same major axis, one having a shorter minor axis (having a flat surface) is preferred since it is easy to enter a narrow gap.

As a method for producing a resin-impregnated fiber bundle, a method using a crosshead die is publicly known, and the production may be carried out in accordance with a method described in, for example, JP-A 2013-107979 (Production Example 1, Production of a resin-impregnated glass long fiber bundle), JP-A 2013-121988 (Production Example 1, Production of a resin-impregnated glass long fiber bundle), JP-A 2012-52093 (Examples 1 to 9), JP-A 2012-131104 (Production Example 1, Production of a resin-impregnated glass long fiber bundle; Production Example 2, Production of a resin-impregnated carbon fiber long fiber bundle), JP-A 2012-131918 (Production Example 1, Production of a resin-impregnated carbon fiber bundle; Production Example 2, Production of a resin-impregnated glass fiber bundle), JP-A 2011-162905 (Example 1), and JP-A 2004-14990 (Example 1 to 7).

For producing a resin-impregnated fiber bundle having the above-described flatness ratio, applicable is a method for controlling an exit shape of a crosshead die, or a method wherein a bundle is passed between two rollers (forming rollers) arranged above and below the bundle at a stage after being discharged from an exit of a crosshead die and before being cooled.

<Compression Molded Article>

A compression molded article of the present invention is in a form that, in a state where a required amount of resin-impregnated fiber bundles is randomly arranged, contacting resin-impregnated fiber bundles are fused with each other.

The required amount of resin-impregnated fiber bundles is a total number of resin-impregnated fiber bundles to be used in accordance with the size (volume) and the density of a compression molded article of interest.

The required amount of resin-impregnated fiber bundles can be calculated by determining the size (volume) and the density of a reference compression molded article and finding the total number of resin-impregnated fiber bundles required therefor by means of prototyping.

The size (volume) and the density of a compression molded article of interest can be determined in accordance with the use.

The compression molded article of the present invention may be, for example:
(I) in such a form that, in a state where a required amount of resin-impregnated fiber bundles is randomly arranged only in a plane direction (for example, horizontal plane or vertical plane) (in a two-dimensionally arranged state), contacting resin-impregnated fiber bundles are fused with each other; or (II) in such a form that, in a state where a required amount of resin-impregnated fiber bundles is randomly arranged in a plane direction and in a direction oblique to the plane direction (in a three-dimensionally arranged state), contacting resin-impregnated fiber bundles are fused with each other.

Since the resin-impregnated fiber bundle of the present invention has the above flatness ratio in the range of 1.2 to 8.0, contiguous resin-impregnated fiber bundles easily come into contact with each other thereby to provide an increased contact area in both of the above forms (I) and (II) compared to the case where the cross-sectional shape is circular or elliptical close thereto. Thus, the resin-impregnated fiber bundles are easily fused with each other when they are placed in a heating atmosphere.

Further, since the resin-impregnated fiber bundle of the present invention has the above flatness ratio of in the range of 1.2 to 8.0, it is preferred as it easily turns into the form (II) compared to the case where the cross-sectional shape is circular or elliptical close thereto. For example, when there are gaps among resin-impregnated fiber bundles, it is difficult for bundles with a circular cross-sectional shape to enter the gaps, but it is easy for bundles with a flattened cross-sectional shape to enter the gaps, thereby making it easy to provide a three-dimensional arrangement.

Especially, use of resin-impregnated fiber bundles of the present invention having a flat surface is preferred because the form (II) is more easily achieved.

The compression molded article of the present invention preferably has a thickness of 1.5 to 10 mm and a density of 1.10 to 1.80 g/cm$^3$.

The compression molded article of the present invention includes not only those having a planar shape but also those having a curved surface shape.

The compression molded article of the present invention has especially a high surface impact strength; and therefore, when it is formed in an article with a plate shape, it can possess a largely extended working life.

<Method for Producing a Compression Molded Article>

A method for producing a compression molded article of the present invention will be described.

At a first process, a required amount of resin-impregnated fiber bundles is charged in a heating container in a state where they are randomly arranged, and preferably in a state where they are three-dimensionally and randomly arranged in a plane direction and in a direction oblique to the plane direction. Since the resin-impregnated fiber bundles have a small bulk density of 0.1 to 0.4 g/cm$^3$, the unevenness in the thickness of the resin-impregnated fiber bundles charged into the heating container is small and the thickness is nearly even.

Please note that addition of vibrations to the heating container if necessary enables leveling of the thickness after the resin-impregnated fiber bundles are charged.

When the vibrations are added, three methods including adding vertical vibrations, adding horizontal vibrations and adding both vertical and horizontal vibrations to the heating container may be applied. A method for adding vertical vibrations or both vertical and horizontal vibrations is preferred as the thickness of the resin-impregnated fiber bundles is controlled for a shorter time period.

At a next process, the resin-impregnated fiber bundles in the heating container are pre-heated by a non-contact heater.

The non-contact heater preferably has a heat source selected from infrared radiation, near infrared radiation, induction heating (IH) and hot-air.

The pre-heating is carried out until the resin-impregnated fiber bundles charged into the heating container are fused and integrated with each other in such a degree that the entire thereof does not move.

The resin-impregnated fiber bundles used at the previous process have as small as a bulk density of 0.1 to 0.4 g/cm$^3$ and many gaps are present among the resin-impregnated fiber bundles. Thus, use of even a non-contact heater enables the quick diffusion of heat over the entire resin-impregnated fiber bundles in the heating container, and thus, the bundles can be integrated by a short period of treatment.

At a next process, the pre-heated resin-impregnated fiber bundles are compressed while being heated, thereby providing a compression molded article.

In this compression process, the integrated product of the resin-impregnated fiber bundles obtained at the previous process is placed into a press metal mold, and then, compressed while being heated.

The heating temperature during compression is a temperature lower than a softening point of the thermoplastic resin contained in the resin-impregnated fiber bundles, preferably lower than the pre-heating temperature.

In the compression process, a heat and cool molding method may be applied in order to shorten a molding cycle period or enhance a surface appearance.

The heat and cool molding method is a method, which includes molding in a state where a mold temperature is quickly increased before compression molding, and then cooling rapidly.

Further, the above-described pre-heating treatment is conducted again on an article molded by compression molding, and then compression molding is conducted again. This improves the dispersibility of the fibers in the molded article and enhances the homogeneity of the molded article. Therefore, a further stable product (good dispersibility of fibers in the molded article allows the molded article to have stable mechanical properties) can be obtained.

The compression is carried out so that the compression molded article has a thickness of 1.5 to 10 mm and a density of 1.10 to 1.80 g/cm$^3$.

EXAMPLES

Example 1 (Production of a Resin-Impregnated Glass Fiber Bundle)

A fiber bundle or Component A (glass fiber 1: a bundle of about 1600 glass fibers with a diameter of 13 μm) composed of glass long fibers bundled with a binder was passed through a crosshead die.

At that time, a molten product of polypropylene or Component B (PMB02A manufactured by SunAllomer Ltd.) was fed to the crosshead die from other biaxial extruder (having a cylinder temperature of 290°C), so that the glass long fiber bundle was impregnated therewith.

Thereafter, the bundle was shaped by a shaping nozzle at an exit of the crosshead die and the shape thereof was adjusted by shaping rollers; and then, it was cut into a predetermined length by a pelletizer, so that the resin-impregnated fiber bundles shown in Table 1 were obtained.

When the thus-obtained resin-impregnated fiber bundle was cut and checked, glass long fibers were almost parallel in a lengthwise direction and up to the center thereof was impregnated with the resin.

Measurement of the average length (D1) of the major axis and the average length (D2) of the minor axis was carried out by the following method.

10 resin-impregnated glass fiber bundles were taken out; their major axis length and minor axis length of the cross-section (the end face) were measured by use of a scanning electron microscope; and averages thereof were obtained. Specifically, among straight lines crossing the cross-section, a straight line having the longest length between two intersections where the straight line crosses the periphery of the cross-section is referred to as the major axis; and among straight lines vertically crossing the major axis, a straight line having the longest length between two intersections where the straight line crosses the periphery of the cross-section is referred to as the minor axis.

(Method for Measuring a Bulk Density)

About 200 g of resin-impregnated glass fiber bundle (mass: m), weighed with the accuracy of 0.1%, was gently charged into a dried 1000-ml graduated cylinder (minimum scale unit: 2 ml) without compaction, and a loose bulk volume ($v_0$) thereof in a (loosened) state without tapping was read as the minimum scale unit. Thereafter, the value for $m/v_0$ was used to acquire a bulk density (g/cm$^3$).

Examples 1 and 2, Comparative Example 1, Reference Example 1

About 150 g of the above-described resin-impregnated glass fiber bundles was prepared, and charged into a stainless flat-bottomed container so that it had almost the same thickness from a position at a height of 15 to 20 cm.

Thereafter, heating (non-contact heating) at 200° C. for 100 seconds in a furnace (INFRASTEIN N7GS manufactured by NGK Insulators, Ltd.; equipped with an infrared heater as a heat source) was conducted three times in total. This heating treatment allows the glass fiber bundles in the flat-bottomed container to be integrated by fusion of the polypropylene.

Thereafter, the integrated product of the resin-impregnated glass fiber bundles was pressed for 10 seconds by a pressing machine (STI-1.6-220VF manufactured by Sanyu Industries Co., Ltd.) (at a temperature of 170 C and a pressure of 2 t during pressing).

Then, the product was cooled to room temperature, so that a compression molded article having a rectangular planar shape (length: 200 mm, width: 200 mm, thickness: 2 mm; density: 1.50 g/cm$^3$) was obtained.

(Method for Measuring a Surface Impact Strength)
Drop-weight impact test
Measuring equipment: Graphic Impact Tester B-type (manufactured by Toyo Seiki Seisaku-sho, Ltd.)
Specification: striker diameter=φ12.7 mm
    sample holder diameter=φ76 mm
    Dropping height: 80 cm
    Mass of a weight: 6.5 kg
    Temperature for measurement: 23°C
Sample for measurement: a sample cut into a size of 100 mm per side Measurement was conducted by adding an impact on the center of a sample for measurement and measuring a maximum load N and a total absorption energy J at that time.

TABLE 1

|  |  | Comparative Example 1 | Examples 1 | Examples 2 | Reference Example 1 |
|---|---|---|---|---|---|
| Resin-impregnated fiber bundle | (A) Glass fiber (parts by mass) | 100 | 100 | 100 | 100 |
|  | (B) Polypropylene (parts by mass) | 60 | 60 | 60 | 60 |
|  | D1 (mm) | 2.6 | 1.3 | 1.5 | 2.6 |
|  | D2 (mm) | 2.1 | 0.7 | 0.6 | 2.1 |
|  | D1/D2 | 1.2 | 1.9 | 2.5 | 1.2 |
|  | L (mm) | 11 | 30 | 30 | 20 |
|  | L/D1 | 4.2 | 23.1 | 20.0 | 7.7 |
|  | Bulk density (g/cm$^3$) | 0.63 | 0.28 | 0.16 | 0.32 |
| Compression molded article | Molding method | Press | Press | Press | Injection |
|  | Density (g/cm$^3$) | 1.5 | 1.5 | 1.5 | 1.5 |
| Surface impact strength (maximum load N) |  | 1700 | 3600 | 3800 | 1000 |
| Surface impact strength (total absorption energy J) |  | 10 | 20 | 21 | 7 |

A comparison between Examples 1 and 2, and Comparative Example 1 shows that compression molded articles obtained by using the resin-impregnated fiber bundle of the present invention and by applying the production method of the present invention were excellent in the surface impact strength.

INDUSTRIAL APPLICABILITY

A compression molded article obtained from the resin-impregnated fiber bundle of the present invention is thin and has a high surface impact strength, and thus, it can used for automobile parts, machine parts, construction materials, tableware or trays for household use and business use, various daily necessities, parts for safety footwear, and others.

The invention claimed is:

1. A resin-impregnated fiber bundle prepared by impregnating and integrating 100 parts by mass of a bundle of a fiber material (A) with 25 to 300 parts by mass of a thermoplastic resin (B), wherein:
   the resin-impregnated fiber bundle has a flattened shape with a lateral cross-sectional shape having a major axis and a minor axis (length of the major axis>length of the minor axis);
   an average length (D1) of the major axis is 0.5 to 2.0 mm;
   an average flatness ratio (D1/D2) determined from the average length (D1) of the major axis and an average length (D2) of the minor axis is 1.2 to 8.0;
   the resin-impregnated fiber bundle has a length (L) of 11 to 50 mm and a ratio (L/D1) between L and D1 is 10 to 50; and
   a bulk density is 0.1 to 0.4 g/cm$^3$.

2. The resin-impregnated fiber bundle according to claim 1, wherein the average flatness ratio (D1/D2) is 1.5 to 8.0.

3. The resin-impregnated fiber bundle according to claim 1, wherein the fiber material (A) is selected from a carbon fiber, a glass fiber and an aramid fiber.

* * * * *